May 7, 1935.  I. S. OSBORN  2,000,296

MEANS OF REFUSE INCINERATION

Filed April 30, 1932  4 Sheets-Sheet 1

INVENTOR.
Irwin S. Osborn.
BY Slaughand Caufield
ATTORNEY.

Patented May 7, 1935

2,000,296

UNITED STATES PATENT OFFICE 2,000,296

MEANS OF REFUSE INCINERATION

Irwin S. Osborn, Cleveland Heights, Ohio, assignor to The C. O. Bartlett & Snow Company, Cleveland, Ohio, a corporation of Ohio Application April 30, 1932, Serial No. 608,376

10 Claims. (Cl. 110—8)

This invention relates to means and methods for incinerating refuse.

As is well known, the municipal refuse of large cities, such refuse for example as garbage, paper and the like, is collected from residences, hotels etc. and hauled to incinerating plants for the disposal thereof.

Such plants comprise permanent buildings having therein receiving floors or pits upon or in which the collected refuse is dumped from the collecting wagons or trucks; and furnaces into which the refuse may be charged periodically to be burned; and various apparatus accessory to the furnaces to control the combustion of the refuse therein; receptacles, hoppers or the like into which the residue on the furnace grates may be shaken or dumped; receiving rooms or pits for receiving and collecting ashes, dust and other residue of the incinerating process carried over from the furnace with the products of combustion.

Such plants necessarily must be erected convenient to the refuse collection facilities and therefore in or closely adjacent to the city being served, and thus must almost invariably be erected upon land of relatively great value. Furthermore, it has been found desirable to construct the incinerating furnaces and accessory apparatus in units partly for the reason that there is a natural limit to the size and capacity of a single furnace, and partly because of the need for flexibility of capacity of the plant whereby its operating capacity may be increased or diminished in accordance with the rate at which refuse is supplied to the plant for incineration.

Thus, municipal incinerating plants, particularly where their needed capacity warrants the construction of two or more units, have heretofore been unavoidably expensive to construct and operate, and in most instances have occupied large areas of valuable land which of course has increased still further the expense of installation and the carrying charges therefor.

I have evolved a construction of incinerating plant, which, for a given capacity, may be erected upon a smaller area of ground than has heretofore been possible; and which at the same time effects improvement in the incinerating operation and also effects an improved convenience and economy of operation.

It is therefore an object of my invention to provide an improved construction of refuse incinerating plant wherein the maximum of incinerating capacity may be provided for the minimum of ground area.

Another object is to provide an improved incinerating plant construction of the unit furnace type.

Another object is to provide an incinerating plant construction whereby a given incinerating furnace capacity may be provided at the minimum of construction and installation expense.

Another object is to provide an incinerating plant construction, whereof the building to house the same may be smaller than has heretofore been possible for a given incinerating capacity.

Another object is to provide an incinerating plant construction whereof the building housing the same may be constructed with less material and therefore cheaper than has heretofore been possible for a given incinerating capacity.

Another object is to provide an incinerating plant having improved operating characteristics.

Another object is to provide an incinerating plant having improved combustion characteristics.

Another object is to provide an incinerating plant wherein the discharge of the products of combustion from the stack associated with the furnaces may be more free from solid materials than has heretofore been possible.

Another object is to provide an incinerating plant of the type comprising a plurality of units and wherein one unit may be operated without interference from another unit in an improved manner.

Another object is to provide an incinerating plant having improved facilities for removing the residue of combustion.

Another object is to provide an incinerating plant adapted to be operated more economically from the standpoint of labor than has heretofore been possible.

Another object is to provide in an incinerating plant of the class in which the refuse burning furnaces are charged by an overhead crane, an improved construction whereby the charging of the furnaces may be effected by relatively short bridge movements of the crane and relatively long trolley movements thereof to effect an economy of operation.

Another object is to provide a refuse incinerating plant wherein the furnaces may be charged by relatively short runs from the supply to the furnaces.

Another object is to provide an incinerating plant construction wherein the furnaces may be charged with refuse more economically than has heretofore been possible.

Another object is to provide a refuse incinerating plant construction whereby the removal of ashes, dust, and other residue may be effected more economically than has heretofore been possible.

Another object is to provide in a refuse incinerating plant construction, an improved means for separating dust and other solid material in the products of combustion, from the gaseous products of combustion, and to prevent the solid material from discharging from the furnace stack.

Other objects will be apparent to those skilled in the art to which my invention appertains.

My invention is fully disclosed in the following description taken in connection with the accompanying drawings in which.

Figure 1:
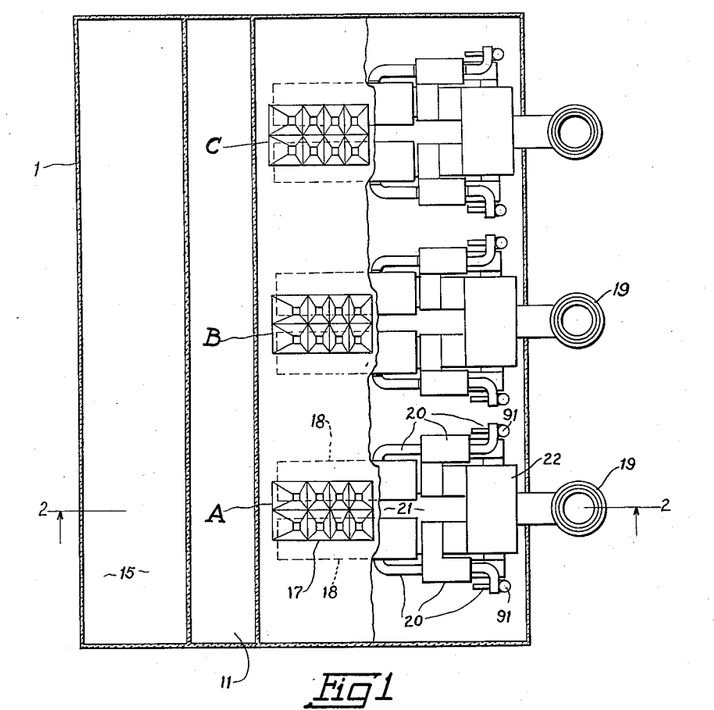
Fig. 1 is a horizontal sectional view of an incinerating plant embodying my invention, and illustrating the general arrangement of the building and incinerating units housed therein.
Figure 2:
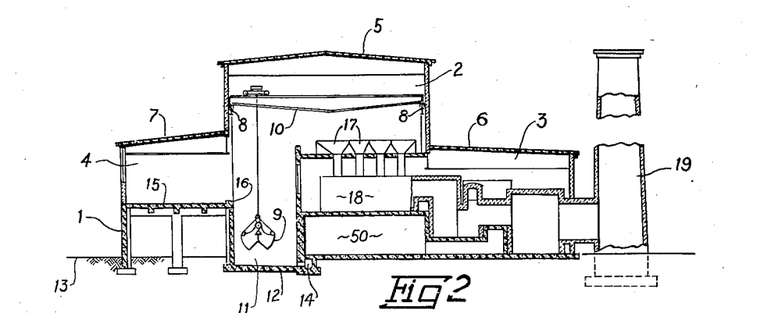
Fig. 2 is a vertical sectional view taken approximately from the plane 2—2 of Fig. 1.

Referring to the drawings, Figs. 1 and 2, I have shown generally at 1 the outer wall of a building in which the elements of an incinerating plant embodying my invention may be housed. As shown in Fig. 2, a relatively high gallery 2 runs longitudinally of the building from end to end, and forwardly and rearwardly of the gallery, relatively lower portions 3 and 4 are provided, the whole being covered by corresponding roof portions 5, 6 and 7.

In the gallery 2, a crane 10 is provided adapted to run lengthwise of the building on rails 8—8, and having a grab bucket 9, preferably of the clam-shell type, which may be raised and lowered, and moved with the bridge travel of the crane from end to end of the building and by a trolley movement, forwardly and rearwardly.

Extending longitudinally of the building is a pit 11, which, in the particular embodiment of my invention under consideration, has the floor 12 thereof substantially at the ground level 13, which may be desirable in cases where drainage must be had at the ground surface. The floor of the pit is sloped forwardly whereby it may be drained by a sewer 14. Where drainage presents no problem, the pit floor 12 may be disposed below the ground level.

Rearwardly of the pit 11, and at an elevation above the same, is a floor 15, running longitudinally of the building, the forward termination of which opens into the pit 11. The floor 15 in the rear portion 4 of the building functions as a receiving floor upon which wagons or trucks collecting refuse from the city may enter the plant and maneuver to dump or tip their loads over the edge 16 into the pit 11. Where the bottom 12 of the pit is disposed substantially at the ground level, as illustrated, the floor 15 may be suitably elevated and a suitable ramp, not shown, may be provided at one end or the other of the building upon which the trucks may run to reach the floor 15.

Where drainage is not a problem, the pit floor 12 may be disposed at a level below the ground surface and therefore the floor 15, if desired, may be at the ground level.

Refuse in the pit 11 may from time to time be picked up by the grab bucket 9, and by combined bridge travel and trolley travel, may discharge the refuse from the bucket into hoppers 17—17 placed directly above furnaces, to be more fully described, but which, in Figs. 1 and 2, are indicated generally at 18—18.

As will be more fully explained hereinafter, each of the furnaces 18 comprises a series, such for example as four cells each, generally of the nature of an individual furnace having grate bars and other furnace elements, and the products of combustion from the cells are carried forwardly toward a stack 19, Fig. 2, out of which the gaseous matter is discharged, the solid residue being left behind, deposited in suitable chambers from which it may be collected and disposed of. It is to be noted in this connection that the furnaces 18, see Fig. 1, together with what may be called their accessory apparatus indicated generally at 20, are arranged in pairs extending forwardly and rearwardly of the building with a space 21 therebetween, and in a forward part of the building unite in an expansion chamber 22, to be more fully described and constituting part of the apparatus 20, and joined to a common stack 19. Thus, as viewed in Fig. 1, and more in detail in Fig. 4, the plan arrangement of a complete incinerating unit is of the form of a letter U, furnaces being in each of the legs of the U and at the closed end of the U their accessory apparatus joining them to a common stack 19.

In Fig. 1 I have illustrated a plant comprising three such units, indicated generally at A, B, and C, respectively, all of which may be served by a common crane 10 in connection with a common pit 11. It will be observed that the hoppers 17 are accessible to the grab bucket 9 with the minimum of travel of the latter. The refuse dumped into the pit 11 from the floor 15 may be in general piled opposite the rearward ends of each of the units A, B, and C, and the grab bucket 9, in serving a furnace unit, such as the unit A, has merely to elevate the refuse, with very little bridge movement of the crane, and then largely by a trolley movement, distribute the refuse over and into the hoppers 17.

An economy of operation of the crane and a saving of labor hours is effected by this novel and convenient arrangement. As a further convenience, the grab bucket 9 carrying a load of refuse need not be accurately positioned over a hopper 17 before dropping the refuse into it. Instead, the bucket 9 may, while in motion of its trolley movement, forwardly and rearwardly over the series of hoppers 17, discharge its bucket load and scatter it over the hoppers 17, the hoppers being constructed as will hereinafter be described so as to direct all of the refuse thus scattered thereupon into one or the other of the hoppers.

As will thus be seen, bridge movement of the trolley is necessary only to position the bucket 9 rearwardly of the unit, A, B, or C, to be supplied, substantially all of the hopper filling movement of the bucket 9 being a trolley movement of the crane.

A relatively small area of land to accommodate a plant of a given capacity according to my invention results largely from the arrangement above described, comprising furnace units A, B and C et cetera, each of U-shaped plan, each consisting of a pair of furnaces 18 and a common terminal chamber 20 and stack 19.

The parallel arrangement of the adjacent furnaces 18 may be served by a plurality of hoppers 17 which may be constructed, in a manner to be described, as in effect a single hopper into which the refuse may be conveniently scattered. Any number of units A, B and C of this construction may be provided all convenient to a a single refuse pit 11 and a single dumping floor 15. And the disposition of the hopper 17 relative to the pit 11 and crane runway, which makes it possible to feed the hopper 17 from the pit substantially wholly by trolley movement of the crane, and which utilizes in the hopper filling movement the minimum of trolley bridge movement effects a still further economy of floor or ground space in the plant as a whole.

The construction and operation of the furnaces 18 and their accessory apparatus will now be described.

Figures 3, 6:
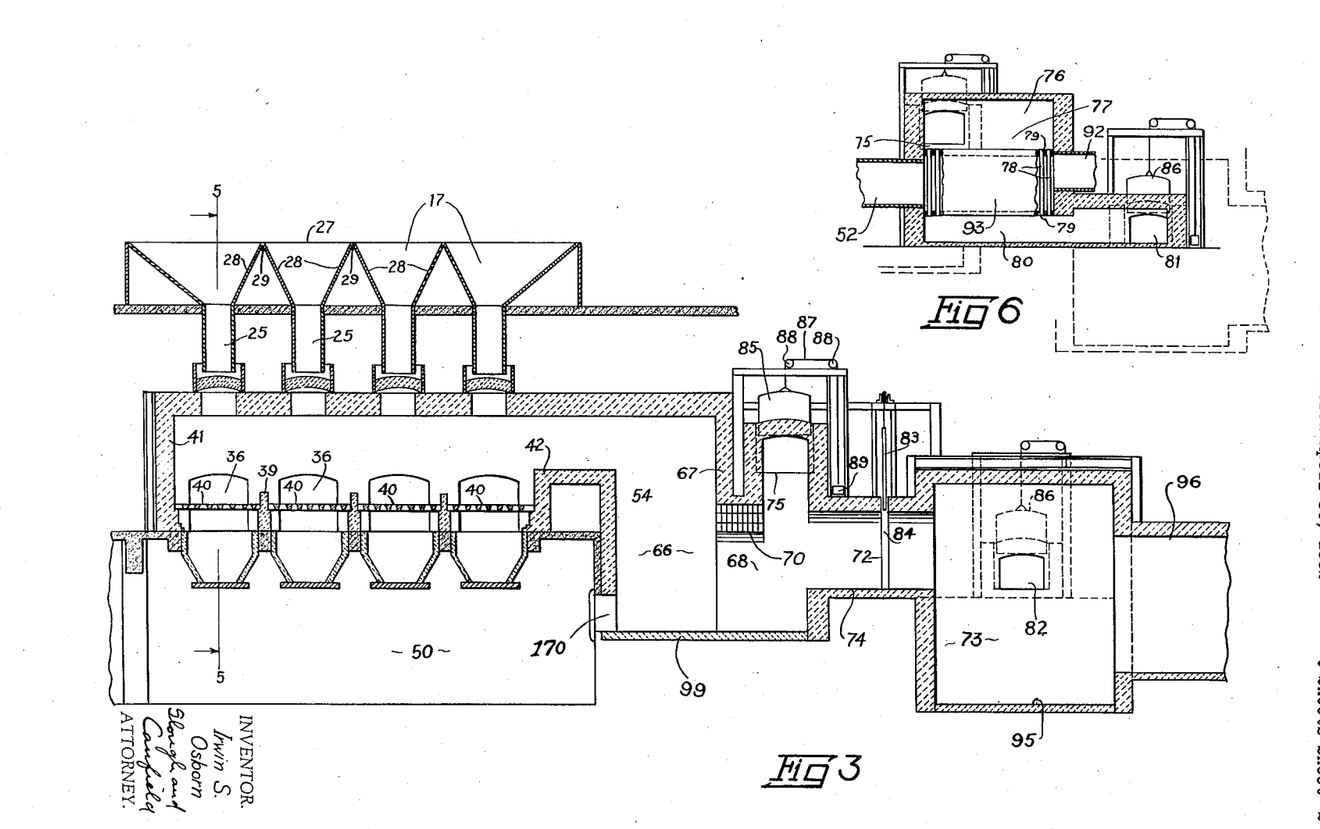
Fig. 3 is a view similar to a part of Fig. 2 drawn to a larger scale and illustrating certain features thereof more in detail.
Fig. 6 is a vertical sectional view taken approximately from the plane 6—6 of Fig. 4.
Figure 5:
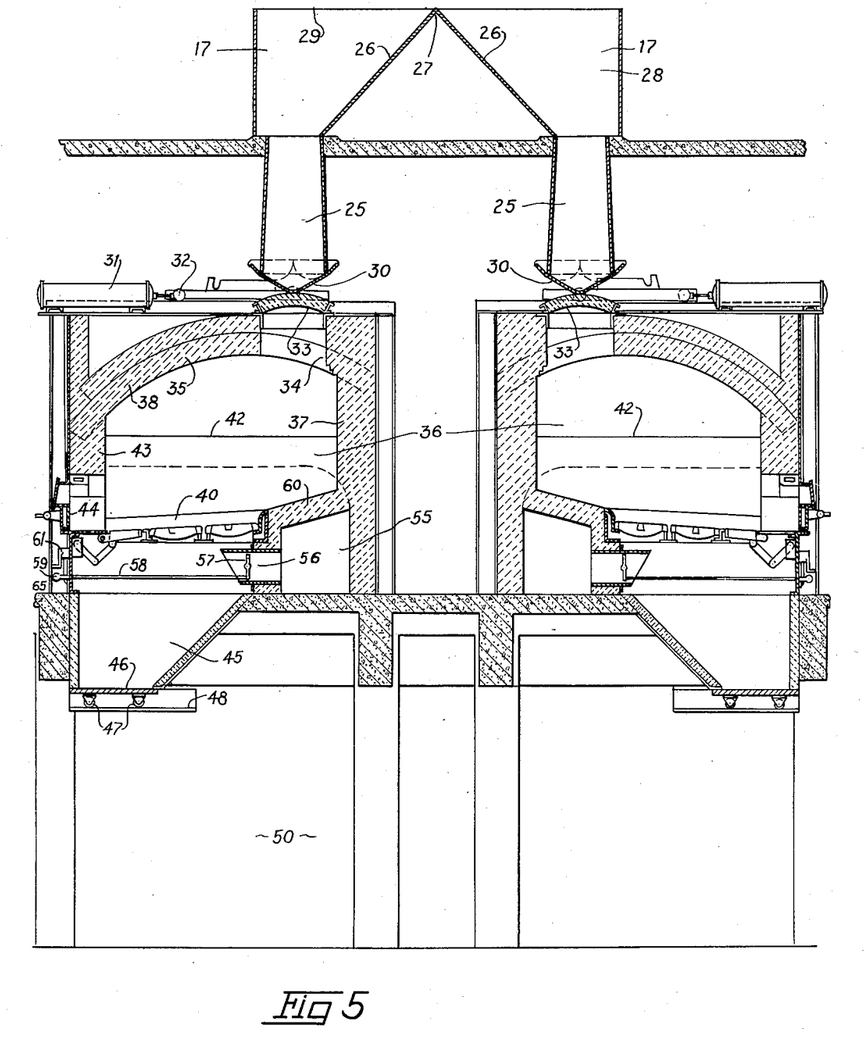
Fig. 5 is a vertical sectional view taken approximately from the plane 5—5 of Fig. 3, and drawn to a larger scale.

The hoppers 17, as plainly shown in Figs. 3 and 5 in connection with Figs. 1 and 2, present to the refuse dropped thereinto, a plurality of sloping surfaces which direct the refuse into charging containers 25—25. The said sloping surfaces comprise the inclines 26—26 converging upwardly into a ridge 27 and comprise inclines 28—28 converging upwardly into transverse ridges 29—29. Thus refuse dropped upon any portion of the hopper area will be directed into the charge containers 25.

As shown in Fig. 5, the charge containers 25 are normaly closed at their lower ends by closure devices 30—30 adapted to be operated to open or close them by a pneumatic cylinder 31 and apparatus 32 connected to a piston in the cylinder and to the closure devices 30.

Directly under the lower end of the charge containers 25 are furnace charging doors 33 normally covering vertically disposed passageways 34 in the upper wall 35 of furnace cells indicated generally at 36. By means of apparatus not fully illustrated but operable by the cylinder 31 and apparatus 32, the closure device 30 and the door 33 may both be operated to open the lower end of the container 25 and to open the passageway 34, whereupon refuse in the container 25 may fall by gravity into the furnace cell 36.

The said apparatus forms no essential part of my present invention and may be of any known or suitable construction and will be believed to be understood by those skilled in this art without further illustration or description.

By this arrangement, the containers 25 may be charged with refuse, from the hoper 17, whenever convenient, whereby a single refuse grab bucket 9 may serve all of the hoppers, and a furnace charge may be retained in the container 25 until a previous charge in the furnace has been disposed of and then the entire furnace charge may be dumped thereinto out of the containers 25.

Figure 4:
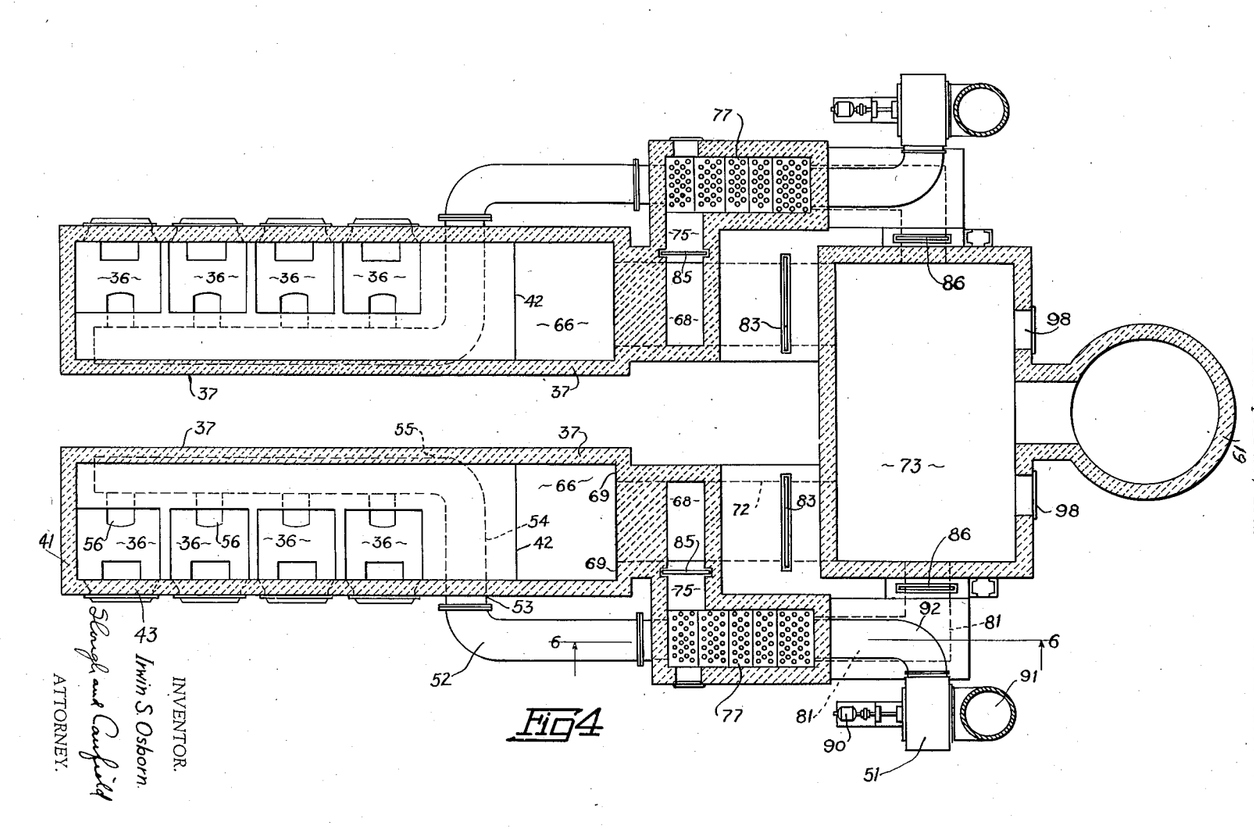
Fig. 4 is a view illustrating to a larger scale a part of Fig. 1, and with parts thereof shown more in detail.

The furnace cell 36 referred to is one of a plurality such as four similar cells, as shown in Figs. 3 and 4, all communicating with each other. The cells comprise a back wall 37, an overhead wall or roof 38 and intermediate transverse, relatively low walls 39; and between the walls 39, are provided grates 40—40; and at one end, that is the rear end of the series of cells, there is a closing end wall 41 and at the opposite end of the series, there is provided a bridge wall 42.

The cells also have a common front wall 43 and in the front wall, for each cell, there is provided a door or doors 44 giving access to the upper side of the grates 40.

Below each grate 40, ash hoppers 45 are provided, one for each cell 36, and the lower end of each hopper is normally closed by a sliding door 46. An accumulation of ash or other residue in the hopper 45 may be periodically discharged out of the bottom of the hopper by displacing the door 46, and for this purpose it is preferably mounted upon rollers or wheels 47 rolling on a trackway 48. If desired, power means (not shown) may be provided to move the door 46. Upon its removal, the contents of the hopper 45 will be discharged downwardly into a basement portion 50 of the building suitably proportioned to permit trucks to be driven therethrough and to place them directly under the hopper 45 whereby the contents of the hopper may be discharged directly into a truck for removal.

As shown in Fig. 2, the basement portion 50 may have its floor on the ground level for convenience of the disposal truck.

Means is provided to supply each of the cells with forced draft to facilitate combustion. An air pump 51, to be more fully described, supplies air through a duct 52 which enters the interior of the bridge wall 42 as at 53, Fig. 4, continues through the bridge wall as at 54 and then turns at a right angle thereto as at 55 where it proceeds along the rear of the row of cells 36 (see Figs. 4 and 5).

From the duct portion 55, air nozzles 56—56 lead the pumped air to the lower side of the grates 40, and the space under the grates being entirely enclosed by the structure above described, the air is forced upwardly through the grates to facilitate combustion.

In a manner to be more fully described later, this forced draft air supply may be previously heated to any desired degree.

The supply of the air may be controlled manually by a butterfly valve 57 in the tubular nozzle 56, the position of which may be adjusted in any suitable manner as, for example, by an element 58 connected to the valve 57 and having an operating handle 59 therefor externally of the cell and adjacent the door 44.

Between the grate 40 and the rear wall 37 is a slightly downwardly forwardly sloping ledge or drying hearth which is disposed immediately under the passageway 34 through which the refuse drops.

In the operation of the furnace cells, as thus far described, the refuse is deposited on the hearth 60. In most cases, the refuse will consist wholly or partly of garbage and therefore will contain a high proportion of moisture. The refuse is therefore permitted to remain undisturbed on the hearth 60 for a suitable period of time in order that moisture may be evaporated therefrom. The construction of the cells permits the charging of each cell with a supply of refuse, independently of the other cells, and thus the deposit of refuse on the hearth of one cell may be dried out by heat from the other cells or by the heat of a previous charge which has been transferred to the grate of the same cell.

In any case, after the charge has sufficiently dried on the hearth 60, an operator may open the door 44 and by means of suitable tools may pull the dried refuse from the hearth 60 over upon the grates 40 of the cell, where it will freely burn fed by the air from the nozzle 56.

As viewed in Figs. 3 and 4, the flame and hot gases from all of the cells flow toward one end of the series of cells, that is, toward and over the bridge wall 42, and thus the heat from one cell will help to dry out the charge supplied to another cell and assist in the combustion thereof.

After combustion on the grate 40 has been completed, the operator at the front of the cell may actuate a hand-operated device 61 to shake and/or dump the grate 40 to deposit the residue of the combustion in the hopper 45.

As will be understood by those skilled in this art, the grates 40 may embody apparatus for shaking or dumping purposes, and where it is desired to feed the refuse to the flame mechanically, various stoker devices may be employed to replace the hand-stoking operation above described. As an example, the hearth 60 may be part of mechanically moving grates and may gradually carry the charge forward into the combustion zone of the cell and ultimately the residue may fall into the hopper 45.

The air cylinder 31 which effects a dumping of a charge of refuse onto the hearth 60 may be manually controlled and such control means may be located convenient to an operator at the front of the furnace on the floor 65, so that the supplying of a fresh charge of refuse, the regulation of the draft through the nozzle 56, the distribution of the refuse on the grate and the dumping and shaking out of the residue, may all be conveniently controlled by the operator to effect the most efficient operation of the various cells, one with respect to another.

As stated hereinbefore, each furnace unit such as the unit A illustrated separately in Fig. 4, has two identical or similar series of cells 36—36 and in the preferred arrangement, the common back walls 37 thereof are disposed parallel to each other and preferably spaced apart and disposed with the bridge walls 42 of the two series at the same ends thereof. The operation of both series of cells is the same. The gaseous products of combustion flow over the bridge wall 42 on the way to the stack 19 and first enter a generally vertical combustion chamber 66 in width substantially the same as the furnace cells and substantially square in horizontal cross-section.

The floor 99 of the combustion chamber 66 is disposed below the furnace cells, and the roof 70 of the outlet flue 68 is relatively low, whereby the products of combustion entering the chamber are caused to flow over a forward vertical wall 67 directly in the path of the gases which causes the gases to roll with relatively great turbulence and to thoroughly mix to cause combustion of any combustible gases which have not yet burned. The gases are thus caused to flow downwardly through the combustion chamber 66 and then to turn forwardly and flow through the flue 68. The width of the flue 68 is restricted by shoulders 69—69, in effect continuations of the wall 67 to further cause a rolling or turbulence of the gases.

The downward component of movement of the gases through the combustion chamber 66, will cause relatively heavy solid matter carried over from the furnace cells with the gases to be deposited on the floor 99 of the combustion chamber from which they may periodically be removed through a door 170 opening into the basement portion 50 of the building.

The gases flowing through the flue 68 may take either or both of two parallel paths. One of these paths is directly straight ahead through the flue and into and through a second flue 72 and thence into an expansion chamber 73.

It will be observed that the floor 99 of the combustion chamber and of the flue 68 are lower than the floor 74 of the flue 72 as well as much lower than the level of the furnace cells, so that the undulating up-and-down path of flow of the gases causes them to roll and mix with great turbulence to effect the completion of combustion mentioned before.

The other parallel path is from the flue 68 upwardly along the wall of the flue 68—72 and out laterally through a passageway 75 into the upper section 76 of an air-heating chamber shown generally at 77, Fig. 6. The hot gases flow from the chamber portion 76 downwardly through a plurality of metal tubes 78—78, generally vertically disposed and secured at their upper and lower ends in headers 79—79. The lower ends of the tubes open into a lower chamber portion 80 and the hot gases flowing into the chamber portion 80 flow therefrom through a duct or passageway 81 which empties into the expansion chamber 73 through a passageway 82. The draft or velocity through the system generally, particularly through the flues 68 and 72, may be controlled by a door or damper 83 movable vertically in grooves 84 in the wall of the flue to more or less obstruct the flow therethrough; and the proportional part of the gases which it is desired to have flow through the parallel path through the heating chamber 77 may be controlled by a vertically movable door or damper 85 opening and closing the passageway 75; and by a similar door 86, communication between the heating chamber 77 and the expansion chamber 73, may be cut off.

The doors 83, 85 and 86 may be of any suitable construction but preferably are counterbalanced as clearly shown for the door 85 by a cord or cable 87 running over pulleys 88—88 and carrying on one end the door 85 and on the other a suitable counter-weight 89. Any suitable control means may be provided to raise and lower the doors.

The heating chamber 77 is provided to preheat the supply of forced draft combustion air supplied by the blower 51. This blower may be operated by a motor indicated at 90 and may have an intake duct 91 and an outlet duct 92. As clearly shown in Fig. 6, the duct 92 communicates with a housing 93 enclosing the headers 79—79 and the tubes 78—78, so that the air supplied by the blower blows through the housing 93 and is heated by heat from the gases in the chamber 77 transferred through the tubes 78.

The housing 93 communicates with the duct 52 above described to supply air to the furnace cells. In this connection, the pyrometers and thermometers may be disposed in the furnace cells 36, combustion chamber 66 and elsewhere if desired; and the temperature of combustion may be maintained at desired values by controlling the temperature of the supplied pre-heated air, the temperature of which in turn may be controlled by suitably adjusting the positions of the door 83 and/or the door 85 to increase or diminish the quantity of heat transmitted to the air in the chamber 76.

As stated above, the flue 72 and the passageway 82 open into the expansion chamber 73. This is a relatively large chamber and the floor 95 thereof is disposed a relatively great distance below the flue 72 and passageway 82, the latter being substantially on a common level. Thus, the final products of combustion discharged in the expansion chamber 73 are at once reduced to a low velocity and flow at a relatively low velocity into the flue 96 leading directly to the stack or chimney 19.

Due to the low rate of movement of the gases in the expansion chamber 73, any solid material such as dust or the like will fall by gravity to the floor of the chamber whence it may be removed through suitable clean-out doors 98—98.

As will now be understood, the products of combustion of both series of furnace cells 36 flow through identical chambers and flues, the hot gases from each series being employed to any extent desired to pre-heat the air of combustion therefor, and the gases and products of combustion ultimately, from both series of cells, flows into the common expansion chamber 73.

In some instances, combustible gases given off from the refuse on the grates may flow entirely through the system and be discharged into the expansion chamber 73 before burning, and the final and thorough mixing of gases in this chamber, together with the periodic addition thereto of burning gases or burnt gases at combustion temperature, may be relied upon to ignite and burn such unburnt gases discharged into the expansion chamber.

In this connection, it is a distinct advantage to discharge both sets of furnace cells into the single expansion chamber inasmuch as unburnt gases discharged into the chamber from one series of cells may be ignited by gases coming into the chamber from the other.

The aforesaid discharge of unburnt gases into the combustion chamber 31 may occur when all or a part of the cells of one of the series may be relatively cool and while hot enough to distill off combustible gases, are not hot enough to consume them.

As will now be apparent, both of the furnaces may be operated concurrently, or, one may be shut down and the other operated alone. In the latter case, the corresponding doors 86 and 83 may be closed.

Inasmuch as the intake ducts 91—91 of the forced draft air-pumping system above described are in the incinerator building, they will function to exhaust the air contents of the building and discharge them through the furnaces and out through the stack. It will therefore be apparent that, in accordance with the well known practice, the air supply ducts 91 may be connected to a system of ducts leading to various parts of the building, particularly those in which odor from the refuse may occur to thoroughly ventilate such parts of the building and draw off the odors. Thus the entire building may be rendered free from odor.

My invention is not limited to the exact details of construction hereinbefore described and illustrated. For example, whereas I have illustrated and described an incinerating plant in which the combustion air is supplied to the furnaces by forced draft, it will be understood that in many of its affects my invention may be practiced with natural draft. In some cases, in fact, it may be preferable to employ natural draft, for example when the refuse to be burned is extremely dry.

The construction of the furnaces and the furnace cells thereof may be variously modified and various well known controls and accessory apparatus may be disposed convenient to an operator on the floor in front of the furnaces. Stoking doors may be provided whereby the operator may operate stoking tools through a relatively small opening without opening the main furnace doors 44.

The doors or dampers 83, 85 and 86 may be variously operated to control the velocity of the products of combustion through the plant and/or to control the relative proportion of the hot products of combustion diverted through the heating chamber 77. In some instances it may be preferred to control the flow through the heating chamber 77 by means of the damper 86, and in other cases by means of the damper 85 or by both dampers, and in some cases it may be preferred to set these dampers at suitable open positions and regulate the flow therethrough by positions of the damper 83.

While I have shown the passageway 75 as opening out of the flue 68, it will be understood that the passageway 75 may, by suitable construction, open directly into the combustion chamber 66; and all such changes and modifications are comprehended within the scope of my invention.

Other changes and modifications may be made within the scope and spirit of my invention without sacrificing its advantages.

I claim:—

1. In a refuse combustion unit for incinerating plants, a furnace for burning refuse including material having a light-weight combustion residue, and a combustion passageway, an expansion chamber, and a stack disposed in serial relation with the furnace, the expansion chamber having cross-sectional area at least three times as great as that of the combustion passageway and having volumetric capacity sufficiently large to cause the velocity of gases flowing from the furnace through the passageway to the stack to be reduced at the expansion chamber, after substantially complete combustion, sufficiently to cause residue of light weight carried from the furnace and through the passageway, by the flow of gases of combustion therethrough, to fall by gravity in the expansion chamber and collect therein and not be discharged into the stack.

2. An incinerating plant as described in claim 1 and in which the expansion chamber has a receptacle portion depressed below the point of discharge thereinto from the combustion passageway.

3. In an incinerating plant, a combustion unit of generally U-form plan, comprising two furnaces, each comprising a plurality of furnace cells serially disposed in the outer end portions of the U-legs, combustion passageways leading from each group of cells toward the closed end of the U, a stack at the closed end of the U, and an expansion chamber forming the closed end of the U and communicating with the stack and into which gases of combustion from the two passageways are discharged, after substantially complete combustion, and the expansion chamber having cross-sectional area at least three times that of both combustion passageways and having sufficiently large volumetric capacity to cause the velocity of the gases flowing from the furnaces through the passageways to the stack to be reduced at the expansion chamber sufficiently to cause residue of light weight carried from the furnaces through the passageways by the flow of gases of combustion therefrom, to fall by gravity in the expansion chamber and collect therein and not be discharged into the stack.

4. In an incinerating plant, a combustion unit of generally U-form plan, comprising two furnaces disposed back to back and spaced apart, each furnace comprising a furnace cell, combustion passageways leading from the cell of each furnace toward the closed end of the U-form plan, an expansion chamber forming the closed end of the U, a stack beyond the closed end of the U communicating with the expansion chamber and the expansion chamber communicating with the two combustion passageways, whereby gases of combustion from the combustion passageways may be discharged into the expansion chamber after substantially complete combustion and thence into the stack, the expansion chamber having a depressed receptacle portion below the point of discharge thereinto of the passageways, the expansion chamber having cross-sectional area at least three times that of both combustion passageways and having sufficiently large volumetric capacity, to cause the velocity of the gases flowing from the furnace cells through the passageways toward the stack to be reduced at the expansion chamber sufficiently to cause residue of light weight carried from the furnace cells through the passageways by the flow of gases of combustion therethrough, to fall by gravity in the expansion chamber and collect therein and not be discharged into the stack.

5. In an incinerating plant, a walled building, a combustion unit of generally U-form plan in the building comprising a pair of elongated furnaces communicating each at an end thereof with a combustion passageway, the furnaces and combustion passageways being in the legs of the U, a stack at the closed end of the U, the combustion passageways communicating with the stack, the furnaces being disposed back to back and provided each with a longitudinally extending series of furnace tending doors on the opposite fronts thereof, the combustion unit being disposed with the legs thereof generally parallel to and one leg adjacent to a wall of the building, and floors upon which operators tending the furnace doors may stand disposed immediately between the wall and the doors of the adjacent furnace, furnace charging hoppers, a fuel supply pit, a crane for conveying fuel from the pit to the hoppers, a crane trackway extending over the furnaces and over said floors.

6. In an incinerating plant, a walled building, a plurality of combustion units each of general U-form in plan in the building, and each comprising a pair of elongated furnaces communicating each at an end thereof with a combustion passageway, the furnaces and combustion passageways being in the legs of the U, a stack at the closed end of the U, the combustion passageways communicating with the stack, the furnaces of each unit being disposed back to back and provided each with a horizontal series of furnace tending doors on the opposite fronts thereof, the units being all disposed in a series between opposite walls of the building and parallel to each other and to the walls, a floor portion between each two adjacent units upon which operators tending the furnace doors may stand and a like floor portion immediately between each of the said walls and an adjacent furnace, furnace charging hoppers, a fuel pit, a crane to convey fuel from the pit to the hoppers, a crane trackway extending over all of the furnaces and over said last named floor portions.

7. In a refuse combustion unit for incinerating plants, a furnace for burning refuse including material having a light weight combustion residue, and a combustion passageway, an expansion chamber, and a stack disposed in serial relation with the furnace, a branch passageway branching from the first mentioned passageway and both passageways discharging into the expansion chamber, heat transferring means disposed in the branch passageway, operable valve means for optionally directing the flow of gases through the branch passageway, the expansion chamber having cross-sectional area at least three times as great as that of either of said passageways, and having volumetric capacity sufficiently large to cause the velocity of gases flowing from the furnace through either passageway to the stack to be reduced at the expansion chamber, after substantially complete combustion, sufficiently to cause residue of light weight carried from the furnace and through either passageway by the flow of gases of combustion therethrough to fall by gravity in the expansion chamber and collect therein and not be discharged into the stack.

8. In a refuse combustion unit for incinerating plants, a furnace for burning refuse including material having a light weight combustion residue, and a combustion passageway, an expansion chamber, and a stack disposed in serial relation with the furnace, a branch passageway branching from the first mentioned passageway and both passageways discharging into the expansion chamber, heat transferring means disposed in the branch passageway, adjustably operable valve means for optionally variably directing the flow of gases through the branch passageway, the expansion chamber having cross-sectional area at least three times as great as that of either of said passageways, and having volumetric capacity sufficiently large to cause the velocity of gases flowing from the furnace through either passageway to the stack to be reduced at the expansion chamber, after substantially complete combustion, sufficiently to cause residue of light weight carried from the furnace and through either passageway by the flow of gases of combustion therethrough to fall by gravity in the expansion chamber and collect therein and not be discharged into the stack.

9. In an incinerating plant, a combustion unit of generally U-form plan comprising a pair of elongated furnaces communicating each at an end thereof with a combustion passageway, the furnaces and combustion passageways being in the legs of the U, a stack at the closed end of the U, the combustion passageways communicating with the stack, the furnaces being disposed back to back and provided each with a longitudinally extending series of furnace tending doors on the opposite fronts thereof, the combustion unit being disposed with the legs thereof generally parallel, floors upon which operators tending the furnace doors may stand disposed adjacent the doors on said opposite fronts respectively, furnace charging hoppers, a fuel pit, a crane to convey fuel from the pit to the hoppers, a crane trackway extending over the furnaces and over said floors.

10. In an incinerating plant, a plurality of combustion units each of generally U-form plan, and each comprising a pair of elongated furnaces communicating each at an end thereof with a combustion passageway, the furnaces and combustion passageways being in the legs of the U, a stack at the closed end of the U, the combustion passageways communicating with the stack, the furnaces in each unit being disposed back to back and provided each with a horizontal series of furnace tending doors on the opposite fronts thereof, the units being all disposed in a series and parallel to each other, a floor portion between each two adjacent units upon which operators tending the furnace doors may stand, and a like floor portion at each end of the series upon which operators may stand to tend the doors of the furnaces of the outermost legs of the end units of the series, furnace charging hoppers, a fuel pit, a crane to convey fuel from the pit to the hoppers, a crane trackway extending over all of the furnaces and over said last named floor portions.

IRWIN S. OSBORN.